United States Patent [19]

Murphy et al.

[11] Patent Number: 4,500,136
[45] Date of Patent: Feb. 19, 1985

[54] VEHICLE SEAT INCLUDING IMPROVED ADJUSTABLE SIDE BOLSTERS

[75] Inventors: Randall T. Murphy, Farmington Hills; Dennis Heling, Canton, both of Mich.

[73] Assignee: Lear Siegler, Inc., Santa Monica, Calif.

[21] Appl. No.: 496,617

[22] Filed: May 20, 1983

Related U.S. Application Data

[62] Division of Ser. No. 173,536, Jul. 30, 1980.

[51] Int. Cl.³ .......................... A47C 3/00; A47C 7/14
[52] U.S. Cl. .................................. 297/284; 297/258; 297/260
[58] Field of Search .............. 297/284, 460, 466, 486, 297/464

[56] References Cited

U.S. PATENT DOCUMENTS 2,619,157 11/1952 Guyton et al. ...................... 297/284
3,773,382 11/1973 Coursault ............................ 297/284

FOREIGN PATENT DOCUMENTS 2721539 11/1978 Fed. Rep. of Germany ...... 297/284
2740268  3/1979 Fed. Rep. of Germany ...... 297/284
1365348  9/1974 United Kingdom ................ 297/284

Primary Examiner—Francis K. Zugel
Attorney, Agent, or Firm—Reising, Ethington, Barnard, Perry & Milton

[57] ABSTRACT

A vehicle seat including a backrest portion and a seating portion, each having a pair of movable lateral bolster sections mounted on opposite sides thereof to its frame assembly, wherein a manual adjustment mechanism for each pair selectively and simultaneously moves its bolster sections in a controlled fashion between first and second lateral support positions and wherein the adjustment mechanism maintains the bolster sections in both the first and second lateral support positions. Each of the bolster sections includes a rigid paddle which is embedded in the body of resilient material and which is hingedly connected to the frame assembly. The adjustment mechanism includes a handwheel which upon rotation causes its corresponding paddles to pivot with respect to its frame assembly, either toward each other or away from each other depending upon the direction of rotation.

1 Claim, 11 Drawing Figures

VEHICLE SEAT INCLUDING IMPROVED ADJUSTABLE SIDE BOLSTERS

This is a division of application Ser. No. 173,536 filed July 30, 1980.

TECHNICAL FIELD

This invention relates to vehicle seats and, in particular, to vehicle seats in which the shape of the vehicle seat may be changed.

BACKGROUND ART

The driver and other occupants of motor vehicles experience various driving stresses during the course of a typical drive. Such stress to the body may also include stress to the spine which often causes discomfort and which may cause injury in extreme situations.

The occupants of vehicles may be forced in a lateral direction with respect to their seat, for example, during a vehicle collision or during a sharp turn. The occupants may be thrown against other occupants of the vehicle or the inner side walls of the vehicle. When the driver of the vehicle experiences such forces, he may lose control of the vehicle.

If the backrest portion and/or the seating portion of the vehicle seat are each provided with a pair of lateral bolsters or bolster sections, lateral movement of the occupant of the vehicle seat is more restricted to protect the occupant of the seat. Such a backrest portion of a vehicle seat is disclosed in the Faust U.S. Pat. No. 3,627,379.

The protective quality of vehicle seats having lateral bolster sections is largely determined by how snugly the side bolster sections are laterally positioned about the occupant of the vehicle seat. It is desirable that the distance between such bolster sections be slightly greater than the width of the occupant of the seat. While such snugness is desirable for safety reasons, a certain amount of looseness is also important for the comfort of the occupant. Also such looseness allows the driver the necessary freedom of movement to drive the vehicle.

One possible, yet impractical, solution for providing such lateral support with comfort is to have each vehicle seat custom made to fit each occupant. Such a seat would be expensive and would invariably fail to accommodate others. Also, depending on the amount of clothing worn by the occupant, the seat may at times be unsuitable for an occupant for whom the seat was designed. Obviously, the optimum difference in distance between the bolster section varies depending on the effective width of the occupant.

Consequently, it is desirable that the effective distance between such bolster sections be variable to provide the necessary support and comfort for the particular occupant of the vehicle seat. One known method is to adjust the lateral position of each bolster section by a handwheel which, upon rotation, causes the associated bolster section to move relative to its associated backrest portion. In this way, the distance between the adjusted bolster section and the bolster section mounted at the opposite side of the backrest portion is varied. The other bolster section may be individually adjusted by its own handwheel in a similar fashion.

Such a method for varying the distance between a pair of corresponding bolster sections is not only complicated but also time-consuming in that each of the bolster sections must be individually adjusted to obtain the proper distance therebetween. Furthermore, once the proper distance is obtained, it is possible that one of the bolster sections may be angled to a greater or lesser extent with respect to its corresponding backrest or seating portion than those bolster sections thereby causing discomfort to the occupant of the seat.

Vehicle seats generally of the type to which this invention relates are disclosed by Goldner U.S. Pat. No. 4,169,899, Tischler U.S. Pat. No. 3,727,890 and Capener et al U.S. Pat. No. 3,623,768.

DISCLOSURE OF THE INVENTION

An object of the present invention is to provide an improved vehicle seat having a backrest portion and a seating portion wherein a pair of movable lateral bolster sections are mounted on opposite sides of and projected from at least one of the portions and wherein adjustment means are provided for selectively and simultaneously moving the bolster sections in a controlled fashion between a first lateral support position and a second lateral support position.

Another object of this invention is to provide a vehicle seat having a backrest portion and a seating portion wherein a pair of movable lateral bolster sections are mounted on opposite sides of and projecting from at least one of the portions and wherein adjustment means are provided for selectively and simultaneously moving the bolster sections in a controlled fashion between a first lateral support position and a second lateral support position such that the adjustment means maintains the bolster section in both the first and second lateral support positions.

A further object of the invention is to provide a vehicle seat having a backrest portion and a seating portion wherein a pair of lateral bolster sections are mounted on opposite sides of and project therefrom at least one of the portions and wherein the bolster sections can be simultaneously moved together or apart by a single, relatively easy to operate, manual adjustment mechanism.

Yet another object of the present invention is to provide a vehicle seat having a backrest portion, a seating portion and at least one pair of lateral bolster sections each of which includes therein a rigid support mechanism hingedly secured to its respective vehicle seat portion wherein an adjustment mechanism is adapted to simultaneously move the pair of corresponding support mechanisms between a first lateral support position and a second lateral support position to thereby vary the distance between the lateral bolster sections.

In carrying out the above objects and other objects of this invention, a preferred embodiment of the invention includes a backrest portion, a seating portion, a pair of movable lateral bolster sections mounted on opposite sides of and projecting from at least one of the portions and adjustment means for selectively and simultaneously moving the bolster sections in a controlled fashion between a first lateral support position and a second lateral support position. The adjustment means is adapted to maintain the bolster sections in the first and second lateral support positions. Each of said bolster sections has inner and outer parts. The sections are connected at opposite sides of the one of the portions of their inner parts. The one of the portions includes a frame assembly and wherein each of said bolster sections includes a rigid support paddle, having an outer free end portion and an inner, supported end portion, the inner end portion of said support paddle being hingedly connected to said frame assembly to permit the support paddle to rotate about a first longitudinal axis. Each support paddle is hingedly connected to its respective drive member to permit the support paddle to rotate with respect to the drive member about a second longitudinal axis spaced away from the first longitudinal axis to move the free end portion of the support paddle about the first longitudinal axis. Coupling means is pivoted to said frame assembly to rotate thereon about a pivot point. Operating means including at least one rotary drive shaft is rotatably supported by the frame assembly with handle means for manually rotating the drive shaft. A coupling member is threaded on the drive shaft to be movable along the shaft. The improvement comprises the frame assembly including a pair of mounting flanges, the paddle being hingedly connected to said mounting flanges at a point intermediate the free end portion and the second longitudinal axis to permit the support paddle to rotate about the first longitudinal axis. The coupling member is coupled to the coupling means so that manual rotation of the shaft causes the coupling means to rotate about the pivot point on the frame assembly to cause the drive members to simultaneously move the support paddles.

The adjustment means is preferably manually actuated to move the bolster section between the first and second lateral support positions.

The objects, features and advantages of the present invention are readily apparent from the following detailed description of the best mode taken in connection with the accompanying drawings.

BEST MODE FOR CARRYING OUT THE INVENTION

Figure 1:
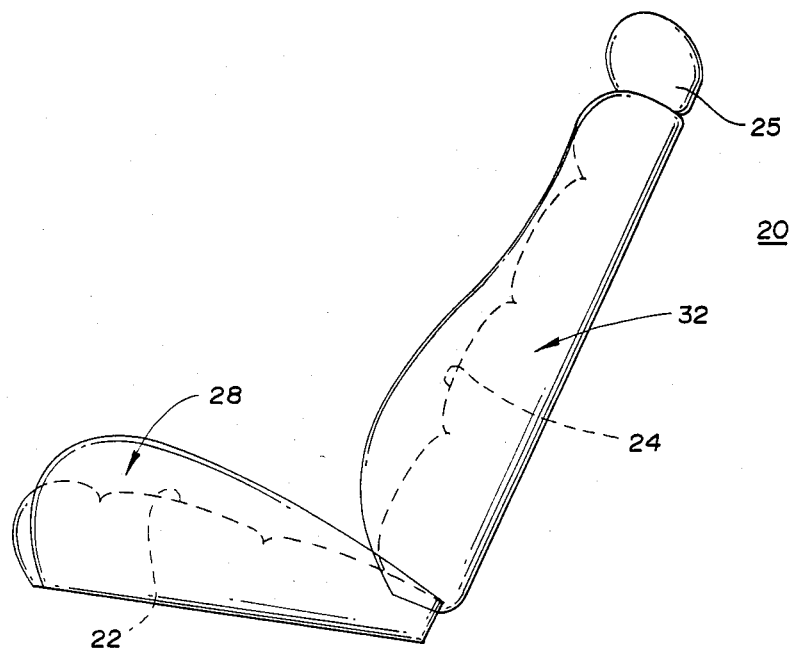
FIG. 1 is a side elevational view showing a vehicle seat.
Figure 2:
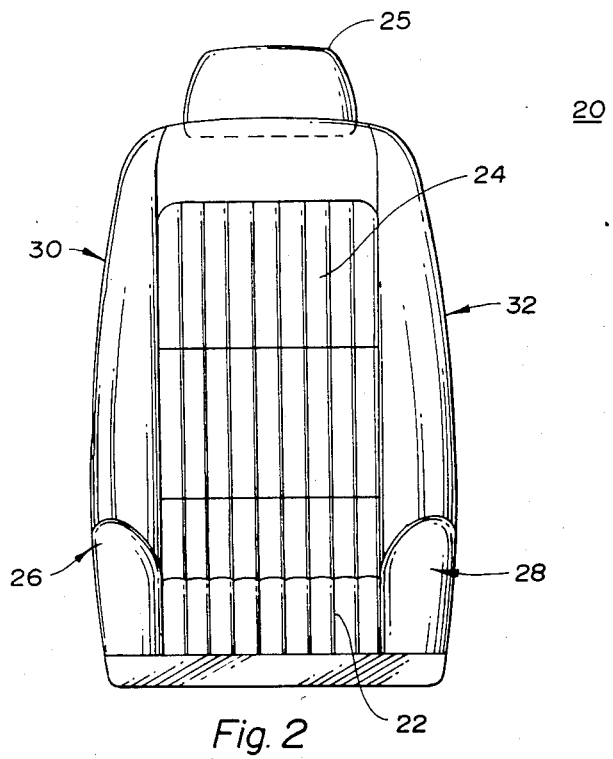
FIG. 2 is a front view of the vehicle seat.

Referring to FIGS. 1 and 2, a first embodiment of a vehicle seat is indicated collectively by reference numeral 20 and includes a seating portion 22, an interconnected backrest portion 24 and a head support 23 mounted at the top of the backrest portion 24. A pair of movable lateral bolster sections comprising a right-hand bolster section 26 and a left-hand bolster section 28 are mounted on opposite sides of the seating portion 22 and project above the top part of the seating portion 22 to laterally support the lower part of the occupant of the seat 20 therebetween.

A second pair of movable lateral bolster sections comprising a right-hand bolster section 30 and a left-hand bolster section 32 are mounted on opposite sides of the backrest portion 24 and project towards the front of the vehicle seat 20 to laterally support the upper part of the occupant of the vehicle seat 20 therebetween.

The lateral bolster sections 26, 28, 30 and 32 are adapted to take up the considerable forces which may occur in the transverse directions of the backrest portion 24 and the seating portion 22, for example, when the person occupying the seat drives at a considerable speed along a curve and is pressed against either the right-hand bolster sections 25 and 30 or the left-hand bolster sections 28 and 32.

Figure 3:
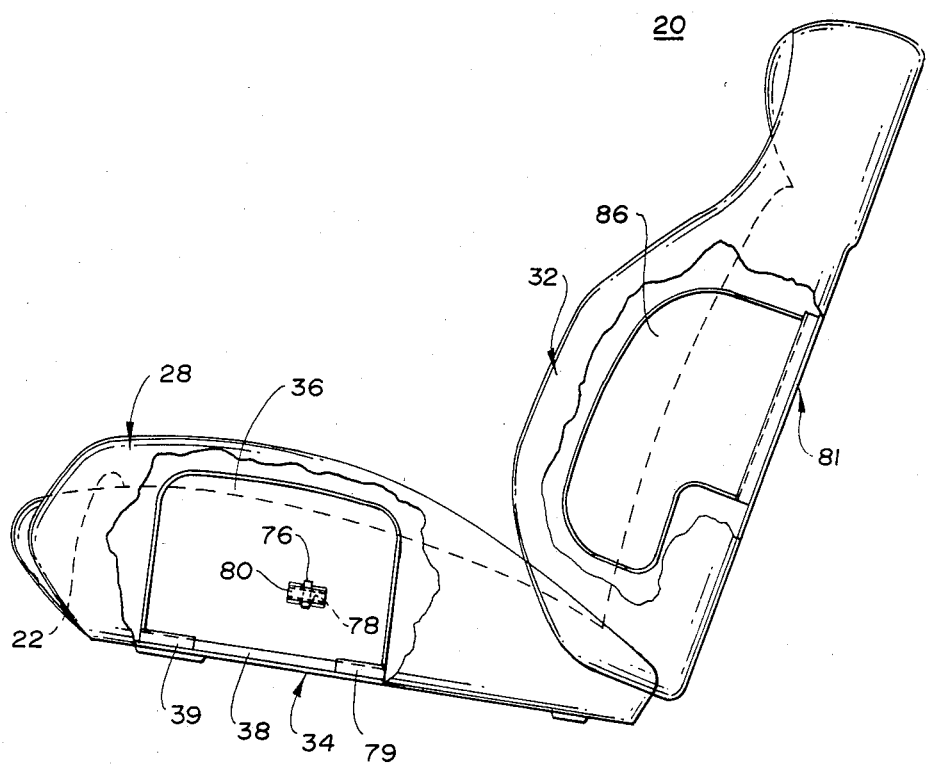
FIG. 3 is a view similar to FIG. 1 wherein the top and bottom sides of the vehicle seat are partially broken away.
Figure 4:
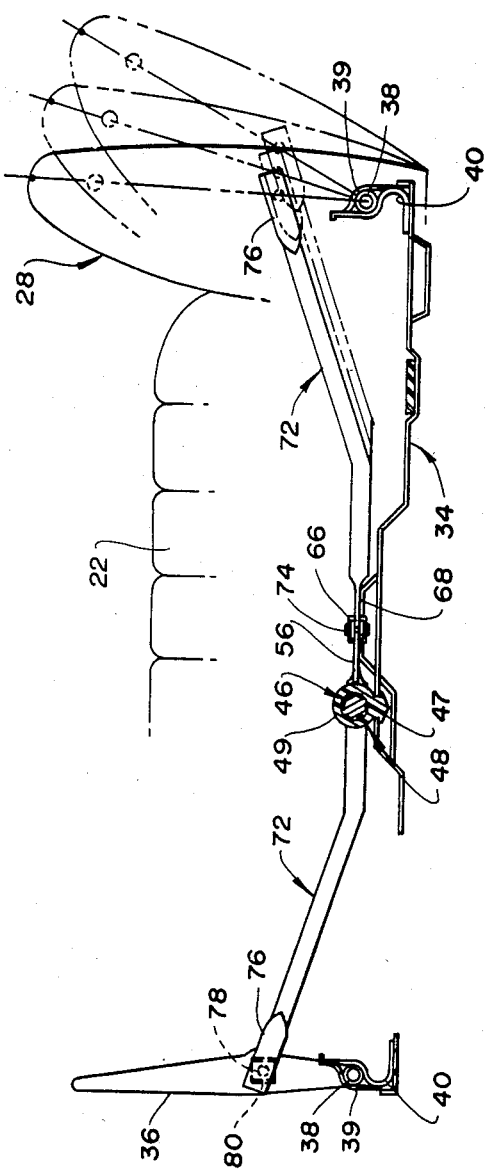
FIG. 4 is a front view of a seating portion of the vehicle seat, partially broken away, and showing an interconnected bolster section in two of its lateral support positions in phantom.

With reference to FIGS. 3 and 4, the seating portion 22 includes a frame assembly 34 to which the right and left-hand seating bolster sections 26 and 28 are hingedly connected at their inner ends. More particularly, the bolster sections 26 and 28 include rigid paddles 36 in the form of metal or plastic paddles or plates, which are pivotally connected to the frame assembly 34 at their lower ends by pivot rods 38. The lower ends of the paddles 36 are formed with sleeves 39 for rotatably retaining the opposite ends of the pivot rods 38 therein. The pivot rods 38 are, in turn, supported by support brackets 40 of the frame assembly 34.

Each of the paddles 36 is embedded along with a suitable spring assembly (not shown) within a body of foam plastic material and an upholstery fabric is applied to the outer surface of the body to complete the construction of each of the right and left-hand bolster sections 26 and 28, respectively.

Figure 5:
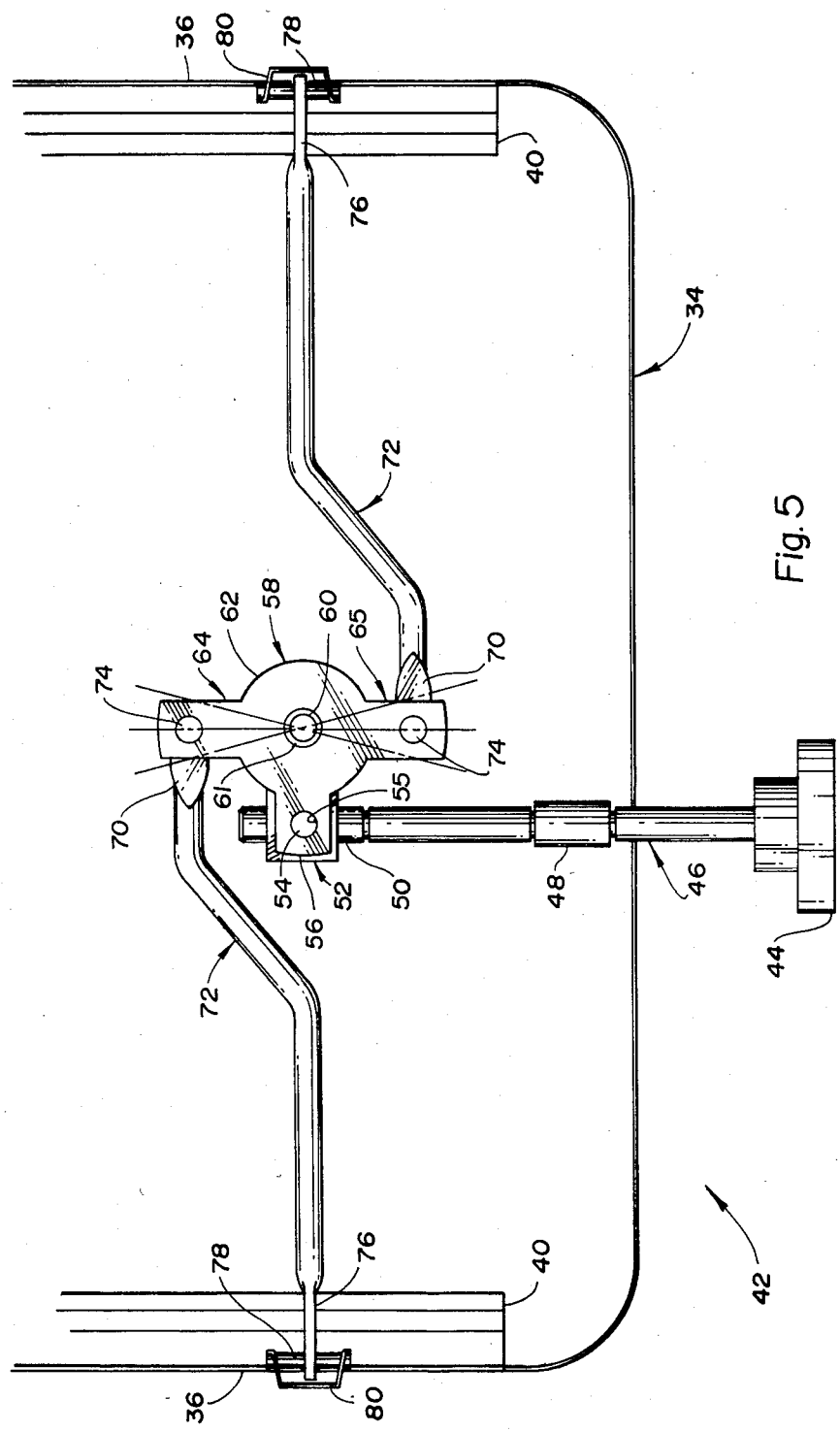
FIG. 5 is a top view of the seating portion showing an adjustment mechanism for varying the distance between the interconnected bolster sections.

With reference to FIG. 5, an adjustment mechanism, generally indicated at 42, is provided for alternately moving both the right and left-hand bolster sections 26 and 28, respectively, either toward each other or away from each other, thereby providing a lesser or greater seating area therebetween. The adjustment mechanism 42 selectively and simultaneously moves the right and left-hand bolster sections 26 and 28 in a controlled fashion between a first lateral support position and a second lateral support position as shown in FIG. 4. The adjustment mechanism 42 also retains and supports the right and left-hand bolster sections 26 and 28 in any desired lateral support position therebetween.

More particularly, the adjustment mechanism 42 is pivotally connected to both of the paddles 36 to pivotally move the paddles 36 about their respective pivot rods 38. The adjustment mechanism 42 includes a single handwheel 44 which is fixedly connected at one end of a drive rod 46 which extends outwardly from its seating portion 22. The drive rod 46 is supported on the frame assembly 34 by a plastic or rubber support bushing 48, as best shown in FIG. 4. A lower end portion 47 of the bushing 48 is secured to the frame assembly 34 and a hollow, cylindrical, upper portion 49 of the bushing 48 supports the rod 46 therewithin above the frame assembly 34.

Opposite the handwheel 44 the drive rod 46 includes a threaded portion 50 which is threadedly received within a movable threaded nut 52 having an upwardly extending pin 54 connected thereto. The pin 54 is received within an aperture 55 which extends through an arm 56 of a rotary device 58. Movement of the threaded nut 52 axially along the rod 46 causes the rotary device 58 to rotate about an upwardly extending axle pin 60 which is fixedly connected to the frame assembly 34 and which extends through an aperture 61 formed concentrically through the rotary device 58. The rotary device 58 loosely fits on the pin 61 to allow the device 58 to rotate in response to axial movement by the nut 52. The rotary device 58 rotates through a slight angle as shown in FIG. 5 when the threaded nut 52 moves on the drive rod 46 in response to rotary motion imparted to the drive rod 46 at the handwheel 44.

The rotary device 58 further includes a plate structure 62 integrally formed with the arm 56 and a pair of arms 64 and 65 integrally formed with the plate structure 62 at opposite sides thereof. Each of the arms 64 and 65 includes a pair of spaced flanges 66 and 68 as best shown in FIG. 4. Tapered end portions 70 of rigid, oppositely extending push rods 72 are received and retained in their corresponding flanges 66 and 68. The end portions 70 are pivotally connected therebetween the flanges 66 and 68 by pivot pins 74. The push rods 72 are also pivotally connected at their opposite tapered end portions 76 to the paddles 36 by pivot rods 78. The rods 78 are mounted on the paddles 36 by brackets 80.

If the rotary device 58 rotates in a clockwise direction as shown in FIG. 5, paddles 36 are pulled toward each other by the push rods 72. If the rotary device 58 rotates in a counterclockwise direction, the paddles 36 are pushed away from each other by the push rods 72.

Figure 6:
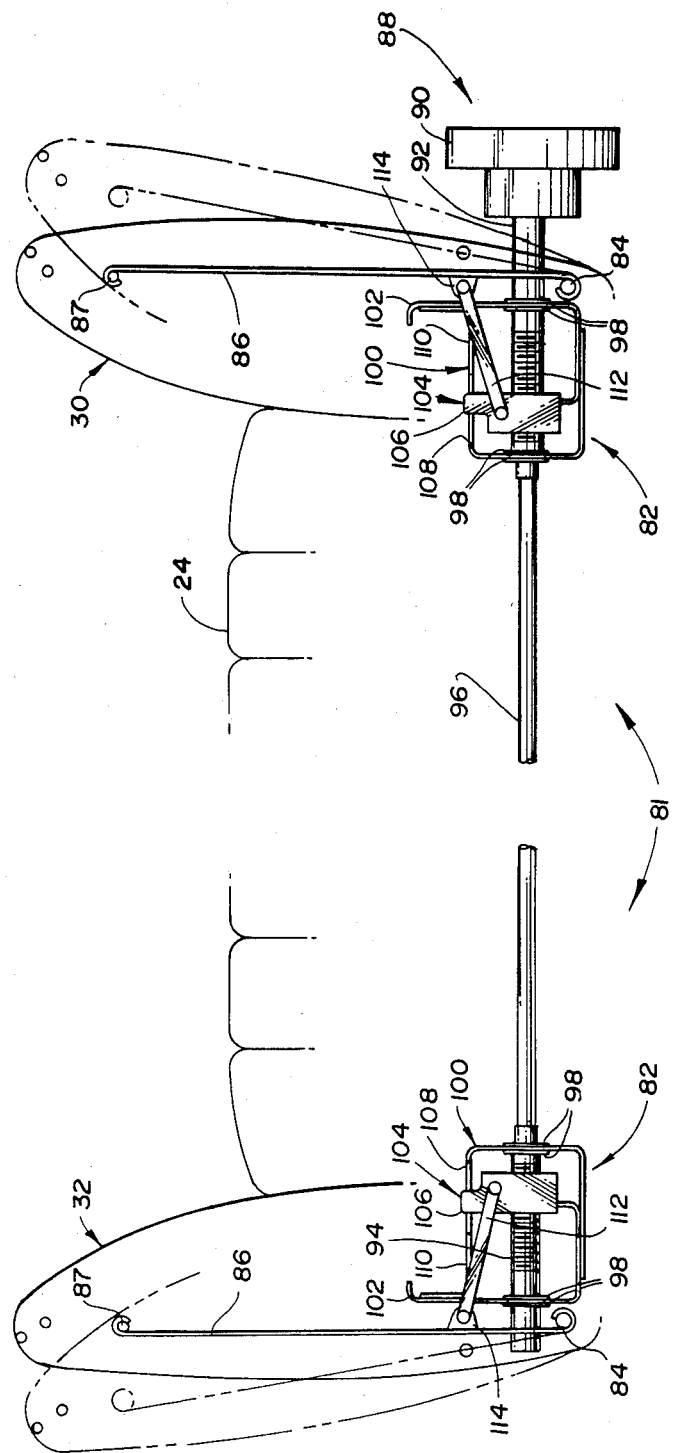
FIG. 6 is a top view of a backrest portion of the vehicle seat, partially broken away, showing interconnected bolster sections in a first lateral support position by solid lines and a second lateral support position in phantom.

With reference to FIG. 6, the backrest portion 24 includes an internal frame assembly 81 having a pair of substantially identical right and left-hand cage structures 82 located at opposite sides of the backrest portion 24. Pivot rods 84 are supported by their respective cage structures 82 at their opposite ends. A pair of paddles 86 of the bolster sections 30 and 32 are pivotally mounted on the pivot rods 84 at the inner ends of the paddles 86. The outer ends of the paddles 86 may be connected to spring assemblies including longitudinally extending wires 87 which are embedded within the bolster sections 30 and 32 as in the bolster sections 26 and 28.

The bolster sections 30 and 32 of the backrest portion 34 are selectively moved simultaneously toward or away from each other in controlled fashion by an adjustment mechanism 88. The adjustment mechanism 88 is adapted to move the bolster sections 30 and 32 between a first lateral support position as shown by the solid lines in FIG. 6 and a second lateral support position as shown by the phantom lines. The adjustment mechanism 88 also maintains the bolster sections 30 and 32 in both of the first and second support positions and any desired support positions therebetween.

The adjustment mechanism 88 includes a handwheel 90 coupled to a threaded drive shaft 92 which, in turn, is coupled to a substantially identical second threaded drive shaft 94 by a flexible drive cable 96. The flexible drive cable 96 is connected to each of the drive shafts 92 and 94 such as by set screws (not shown).

The first and second drive shafts 92 and 94 are rotatably supported within their respective cage structures 82 by spaced pairs of nylon bushings 98. The first and second drive shafts 92 and 94 extend through interconnected first and second support rails 100 and 102 of their corresponding cage structures 82 at the supported bushings. The externally threaded drive shafts 92 and 94 extend in opposite directions, the purpose of which will become apparent hereinbelow.

Disposed within the cage structures 82 and threadedly mounted on their respective drive shafts 92 and 94 are internally threaded drive nuts 104. Each of the drive nuts 104 includes a forwardly extending portion 106 which extends through elongated slots 108 formed through side wall portions 110 of the first support rails 100 and are guided therewith. The drive nuts 104 are threaded to move axially along their threaded drive shafts 92 and 94 either away or towards each other in response to the rotary motion of the handwheel 90.

Pairs of rigid arm members 112 are fixedly connected to their respective drive nuts 104 and are pivotally connected at their opposite ends to tabs 114 which are fixedly mounted to their respective paddles 86. The drive nuts 104 move axially along the drive shafts 92 and 94 either toward each other or away from each other to pivotally move the paddles 86 either toward or away from each other through the interconnection of the arm members 112.

Figure 7:
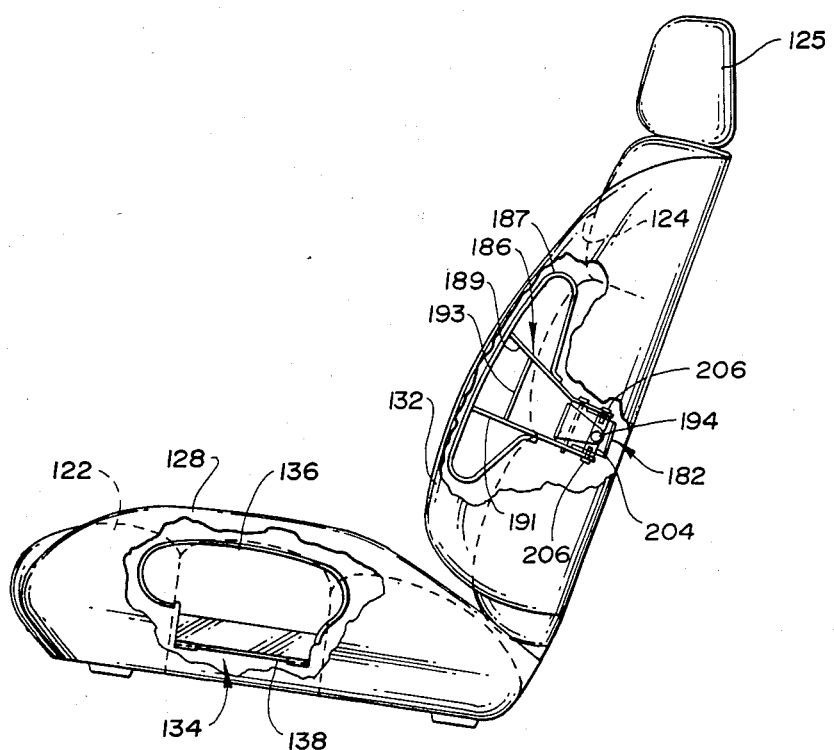
FIG. 7 is a view similar to FIG. 3 showing an embodiment of the present invention.

Referring to FIG. 7, there is shown a preferred embodiment of a vehicle seat 120 constructed according to the present invention. Like the vehicle seat 20, the vehicle seat 120 includes a seating portion 122, an interconnected backrest portion 124 and a head support 125 connected to the top of the backrest portion 124. As in the first embodiment, the vehicle seat 120 includes seating bolster sections 128 (only one of which is shown) hingedly connected at opposite sides of the seating portion 122. Also as in the first embodiment, the vehicle seat 120 includes right and left-hand backrest bolster sections 130 and 132, respectively, hingedly connected to the backrest portion 124 at their inner ends.

The seating portion 122 includes a frame assembly 134 to which paddles 136 (only one of which is shown) are pivotally connected by pivot rods 138 (only one of which is shown). The frame assembly 134 includes a pair of support cages 140, each of which support their respective pivot rods 138 at an outer support bracket 141.

Each of the paddles 136 is fixedly connected to a spring assembly (not shown) of the bolster sections 130 and 132. Each of the paddles 136 together with its associated spring assembly are embedded in a body of foam plastic material so that the bolster sections move with their associated paddle 136.

Figure 8:
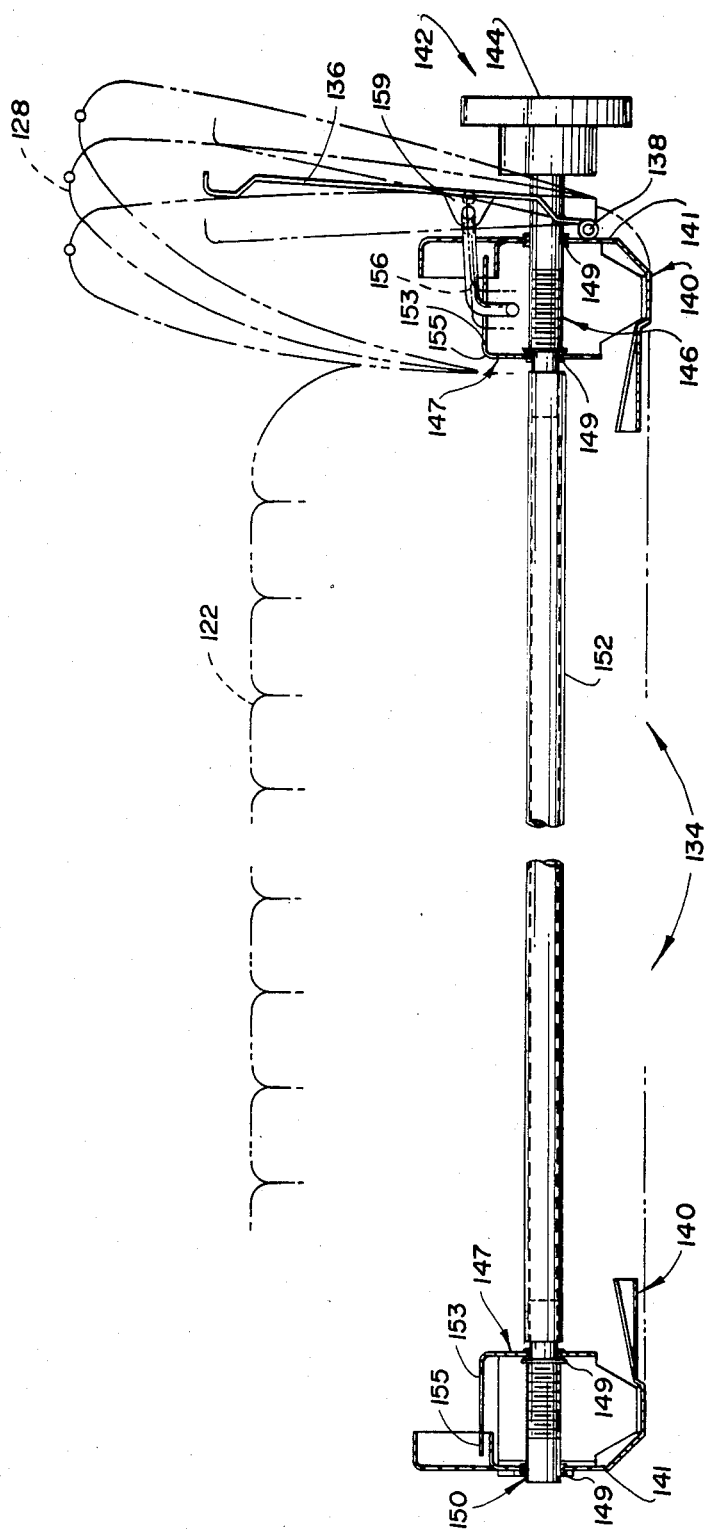
FIG. 8 is a view similar to FIG. 4 showing two lateral support positions of one of the interconnected bolster sections in phantom.

An adjustment mechanism 142 is provided for selectively and simultaneously moving the seating bolster sections 128 between their various lateral support positions including the lateral support positions shown in phantom in FIG. 8 for the left-hand bolster section 128. The adjustment mechanism 142 includes a handwheel 144 adapted to be gripped by the occupant of the seat adjacent the left-hand bolster section 128. The handwheel 144 is coupled to a drive screw or threaded rod 146. The drive screw 146 is coupled to a second drive screw 150 by a connecting tube 152 to transfer the rotary motion of the first drive screw 146 to the second drive screw 150. The drive screws 146 and 150 are supported by the first support brackets 141 and interconnected second support brackets 147 of the support cages 140. The drive screws 146 and 150 are rotatably supported and extend therethrough the first and second support brackets 141 and 147 at supported nylon bushings 149. Set screws (not shown) secure the connecting tube to both of the drive screws 146 and 150.

Figure 9:
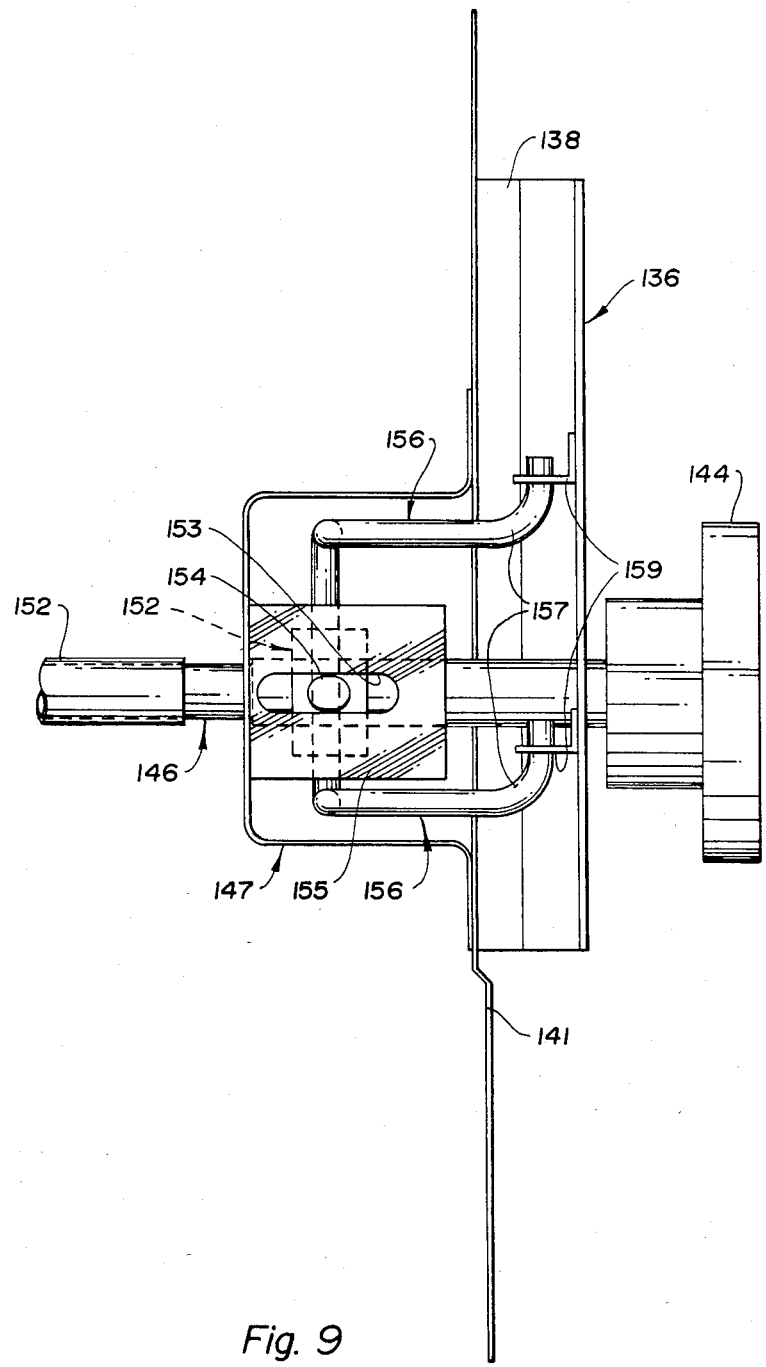
FIG. 9 is a top view, partially broken away, of a part of an adjustment mechanism shown in FIG. 8.

Internally threaded drive nuts 152 (only one of which is shown in FIG. 9 with reference to the left-hand seating bolster section 128) are threadedly mounted on the threaded portions of the first and second drive screws 146 and 150, respectively. Each of the drive nuts 152 includes an upwardly extending end portion 154 which extends through a slot 153 formed through an upper wall portion 155 of each of the second support brackets 157. As the drive screws 146 and 150 are rotated, the drive nuts 152 are guided within their corresponding slots 153.

A pair of rigid arm members 156 are fixedly connected to the drive nuts 152 to move therewith. The ends 157 of the arm members 156 are connected to their respective paddles 136 by mounting brackets 159 to thereby interconnect the threaded nuts 152 and the paddles 136. The paddles 136 pivot about the pivot rods 138 when the threaded nuts 152 move in an axial direction along the first and second drive screws 146 and 150, respectively.

Figure 10:
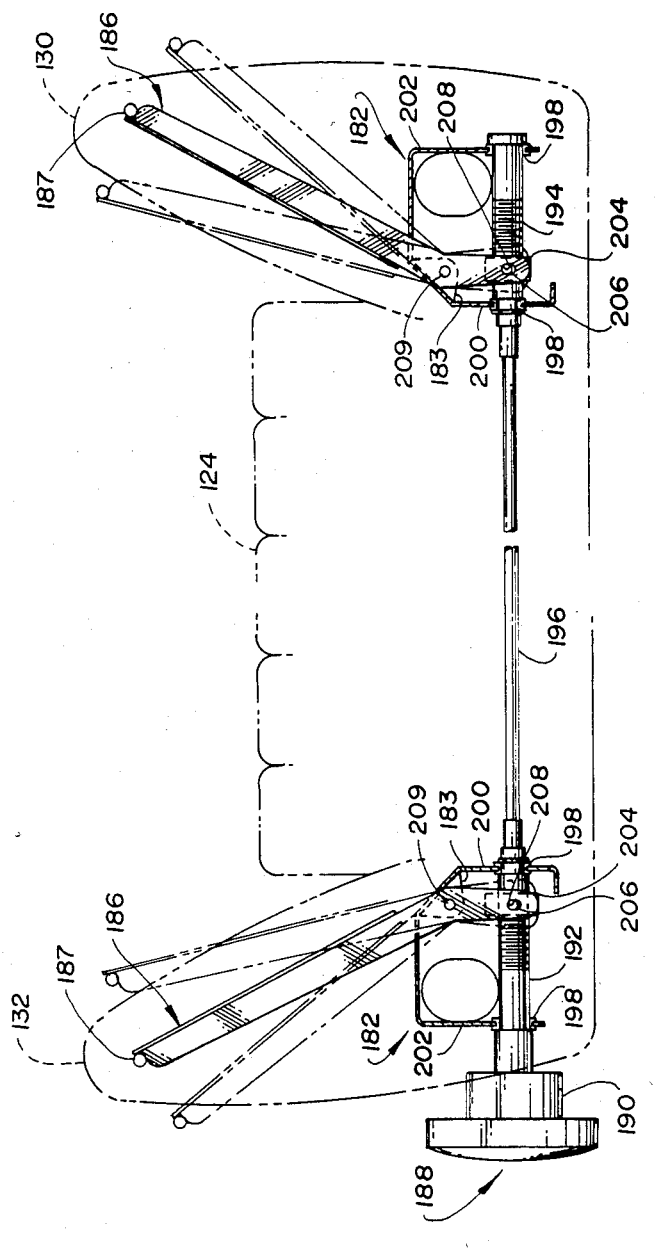
FIG. 10 is a bottom view of a backrest portion of the vehicle seat of the second embodiment, partially broken away, showing two lateral support positions of the interconnected bolster sections in phantom.
Figure 11:
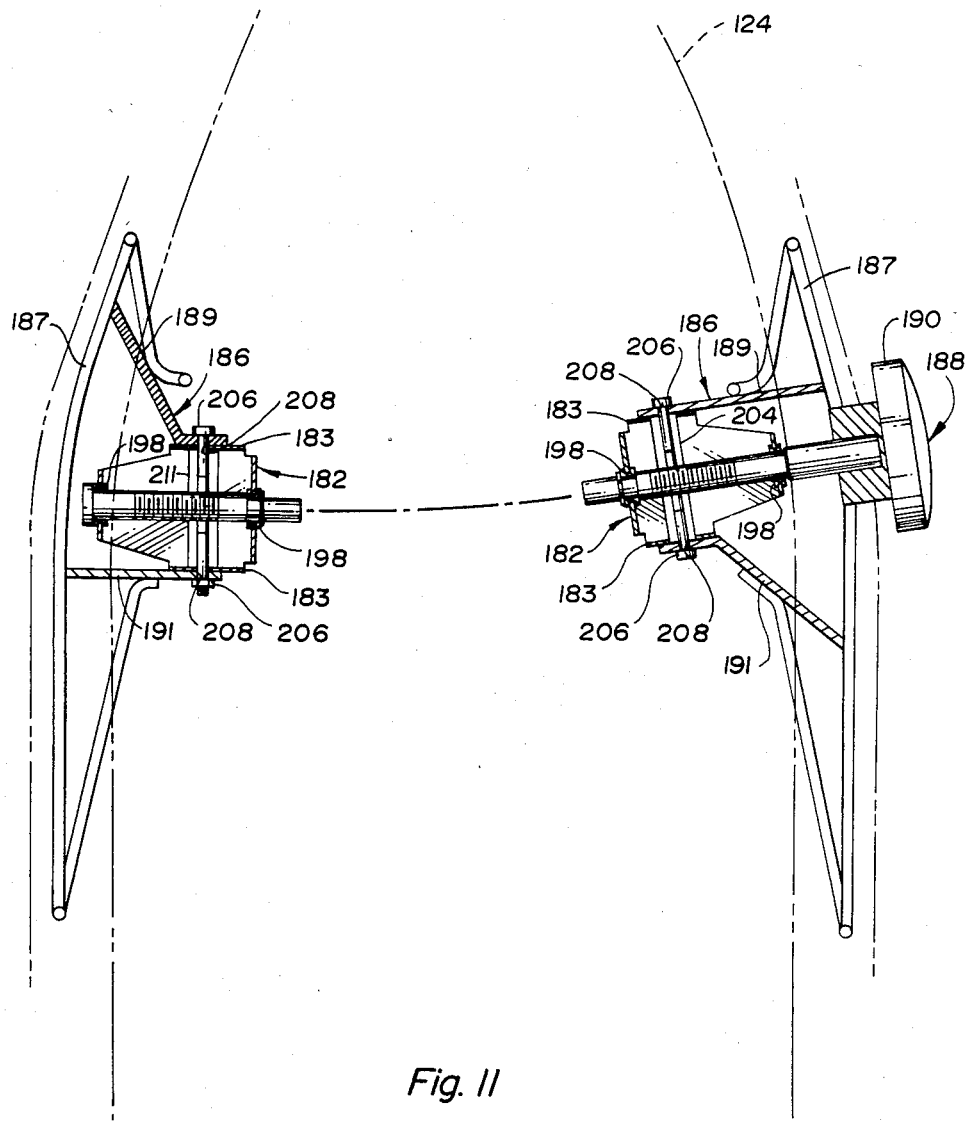
FIG. 11 is a rear view, partially broken away, of the backrest portion of the second embodiment and the interconnected bolster sections.

With reference to FIGS. 10 and 11, a frame assembly 181 of the backrest portion 124 includes a pair of spaced cage structures 182. The cage structures 182 have integrally formed therewith pairs of spaced mounting flanges 183 to which paddles 186 of the bolster sections 130 and 132 are pivotally mounted, as described in greater detail hereinbelow.

The paddles 186 which comprise skeletal frames, are fixedly connected to their associated spring assemblies (part of which is shown at 187 in FIGS. 10 and 11) and the paddles 186, together with their associated spring assemblies are embedded in a body of foam plastic material to form the bolster sections 130 and 132 so that the bolster sections 130 and 132 move with their associated paddles 186.

The paddles 186 are moved from a first lateral support position as shown by the solid lines in FIG. 10 to other lateral support positions, two of which are shown by the phantom lines in FIG. 10, by an adjustment mechanism 188 including a manually operated handwheel 190. The handwheel 190 is coupled to an externally threaded drive shaft 192 which, in turn, is coupled to a second externally threaded drive shaft 194 by a flexible drive cable 196, the ends of which are connected to the first and second drive shafts 192 and 194, respectively, such as by set screws (not shown). The first and second drive shafts 192 and 194 are rotatably supported within their respective cage structures 182 by pairs of bushings 198. The bushings 198 support the first and second drive shafts 192 and 194, respectively, at inner and outer rails 200 and 202 of the cage structures 182 through which the first and second drive shafts 192 and 194 extend.

Internally threaded drive nuts 204 are mounted on the drive shafts 192 and 194. The paddles 186 are connected to the drive nuts 204 to rotate the paddles 186 by pins 206 connected to the drive nuts 204 and which extend through elongated slots 208 formed through upper and lower frame members 189 and 191, respectively, of the paddles 186. Interconnective frame members 193 of the paddles 186 connect the upper and lower frame members 189 and 191 to provide structural strength.

The upper and lower parts 189 and 191, respectively, of the paddles 186 are pivotally connected to the flange portions 183 of their respective cage structures 182 by pivot pins 209 which extend through the upper and lower parts 189 and 191 of the paddles 186. The elongated slots 208 allow the drive nuts 204 to move in an axial direction either towards or away from each other on the first and second drive shafts 192 and 194, respectively, to thereby cause the paddles 186 to rotate about their respective pivot pins 209 and to thereby move from one lateral support position to another lateral support position. When the handwheel 190 is rotated, the first and second drive shafts 192 and 194 will rotate in the same direction. However, the threads of the second drive shaft 194 will rotate in the opposite direction since the ends of the first and second drive shafts 192 and 194 are intercoupled by the flexible drive cable 196.

While two embodiments, including a preferred embodiment of the invention have been shown and described herein in detail, those skilled in this art will recognize various alternative designs and embodiments for practicing the present invention as defined by the following claims.

What is claimed is:

1. In combination with a vehicle seat having a backrest portion and a seating portion, a pair of movable lateral bolster sections mounted on opposite sides of at least one of said portions and projecting therefrom, and adjustment means including a pair of drive members comprising pins for selectively and simultaneously moving the bolster sections in a controlled fashion between a first lateral support position and a second lateral support position, said adjustment means being adapted to maintain the bolster sections in the first and second lateral positions wherein each of said bolster sections has inner and outer parts, said sections being connected at opposite sides of said one of said portions at their inner parts and wherein said one of said portions includes a frame assembly having a pair of mounting flanges and wherein each of said bolster sections includes a rigid support paddle, having an outer free end portion, an inner, supported end portion and upper and lower spaced frame members having elongated slots formed therethrough and adjacent the supported end portion, the inner end portion of said support paddle being hingedly connected to said mounting flanges to permit the support paddle to rotate about a first longitudinal axis and wherein each support paddle is hingedly connected to its respective drive member to permit the support paddle to rotate with respect to the drive member about a second longitudinal axis spaced away from the first longitudinal axis towards said frame end portion to move the free end portion of the support paddle about the first longitudinal axis, coupling means comprising a flexible drive cable pivoted to said frame assembly to rotate thereon about a pivot point, operating means including first and second rotary drive shafts rotatably supported by said frame assembly with handle means for manually rotating one of said drive shafts, a pair of coupling members threaded on their respective drive shafts to be movable along said shafts, said coupling members coupled to said drive cable whereby movement of said coupling members along said shafts as a result of the manual rotation of said shaft causes said drive cable to rotate about said pivot point on said frame assembly to cause said pins to simultaneously move said support paddles, said pins extending through the slots and engaging the upper and lower frame members to thereby cause the paddles to rotate about their respective pins upon movement from one lateral support position to another lateral support position, said first and second drive shafts comprising threaded screws, the threads of one of said drive shafts having a right-handed configuration and the threads of the other of said drive shafts having a left-handed configuration.

* * * * *